US005340061A

United States Patent [19]

Vaquier et al.

[11] Patent Number: 5,340,061

[45] Date of Patent: Aug. 23, 1994

[54] METHOD AND DEVICE FOR REVISING THE LATERAL FLIGHT PLAN OF AN AIRCRAFT

[75] Inventors: Mariannick Vaquier, Limours; Hugues de Beco, Tollouse, both of France

[73] Assignee: Sextant Avionique, Meudon La Foret, France

[21] Appl. No.: 888,069

[22] Filed: May 26, 1992

[30] Foreign Application Priority Data

May 27, 1991 [FR] France ........................ 91 06621

[51] Int. Cl.5 ........................ B64C 13/18

[52] U.S. Cl. ........................ 244/175; 364/448; 340/995

[58] Field of Search ........................ 364/443, 444, 448, 449; 244/175; 73/178 R, 178 H; 340/990, 995, 971, 710

[56] References Cited

U.S. PATENT DOCUMENTS 4,086,632 4/1978 Lions ........................ 364/444
4,692,869 9/1987 King et al. ........................ 364/448
4,812,990 3/1989 Adams et al. ........................ 364/444
5,115,399 5/1992 Nimura et al. ........................ 340/995 X

FOREIGN PATENT DOCUMENTS 0293291 11/1988 European Pat. Off. .
154848 2/1967 Netherlands .
0028883 6/1966 United Kingdom .

OTHER PUBLICATIONS

IEEE First Annual Phoenix Conference on Computers and Communications May 9, 1982, Phoenix, AZ, USA, pp. 307-312; Bowe, L. J.: "Flight-Management System Control Display Technology in New-Generation Transport Aircraft".

*Primary Examiner*—Brian L. Johnson
*Assistant Examiner*—Christopher A. Ellis
*Attorney, Agent, or Firm*—Browdy and Neimark

[57] ABSTRACT

A method for revising the lateral flight plan of an aircraft uses a designator and validator device connected to the flight management system of the aircraft to obtain on the ND screen of this system, in addition to a geographical representation of the flight plan selected by the pilot, a touch-sensitive area associated with each point of the ND screen and dynamically assigned function areas for constructing menus. A cursor is moved on the ND screen by action of the pilot on the designator device. The cursor can be moved to a function area or a touch-sensitive area. activating the function represented by the function area or selecting the touch-sensitive area being achieved by action of the pilot on the validator device. The method simplifies the task of the pilot who has only one display screen to monitor.

9 Claims, 5 Drawing Sheets

METHOD AND DEVICE FOR REVISING THE LATERAL FLIGHT PLAN OF AN AIRCRAFT

BACKGROUND OF THE INVENTION

1. Field of the Invention

The present invention concerns a method and a device for revising an aircraft flight plan.

2. Description of the Prior Art

In many aircraft flight plans are generated by a flight management system with which the pilot dialogues through two interfaces:

- a navigation display (ND) screen on which the route of the aircraft is shown in a horizontal plane on the basis of way points that the pilot selects when preparing the flight, and
- a multicontrol display unit (MCDU) enabling dialogue between the flight management system and the pilot, in particular enabling the pilot to enter way points defining the flight plan and to modify the flight plan subsequently, if required.

Any such modification is usually carried out in several (at least three) stages each involving one or more actions of the pilot at the MCDU keyboard:

- A first stage to select the way point from which a modification is to be made ("FROM WPT"); this first stage involves pressing a page call key ("FPLN") to display way points on the MCDU screen and then to select one of these points.
- A second stage to choose the type of revision to be made to the flight plan; depending on the type of revision, the pilot must:
  either press a function key of the keyboard,
  or call up a revision page.
- A third stage to select the way point at which the revision ends ("TO WPT"): this stage involves entering a way point identification code (by entering alphanumeric characters via the keyboard) and then validating the selected point. Validation usually creates a temporary flight plan.
- A fourth stage to confirm or cancel the flight plan revision; this stage requires operation of a keyboard function key - "confirm" or "cancel". This returns to the flight plan page on the MCDU screen showing on the ND screen the modified flight plan if the "confirm" key is pressed or the original flight plan if the "cancel" key is pressed.

A first drawback of this method is the need to enter characters on an alphanumeric keyboard to modify a map display.

It also requires the pilot to monitor two display screens, the ND screen of the flight management system which is usually a head-up display and the MCDU screen which is of the head-down type.

What is more, the logical relationship between the actions of the pilot on the keyboard keys and the pages displayed on the screen is not at all obvious.

A particular object of the invention is to eliminate these drawbacks.

To this end it proposes a revision method using the map display associated with a designator and validator device.

SUMMARY OF THE INVENTION

In one aspect, the present invention consists in a method for revising the flight plan of an aircraft using a designator and validator device coupled to the flight management system of the aircraft so as to obtain on the navigation display screen of the flight management system, in addition to a geographical representation of the flight plan initially selected by the pilot:

- a sensitive area associated with each point on the navigation display screen,
- dynamically assigned function areas used to construct menus, the function assigned to each area being variable from one menu to another and shown on the screen in corresponding relationship to that area,
- a message area associated with each menu, and
- a cursor moved on all points of the navigation display screen by action of the pilot on the designator device whereby the cursor can be moved to a function area or a touch-sensitive area, the function represented by said function area being activated or a point of said touch-sensitive area being selected by action of the pilot on the validator unit of the designator device, which method comprises the following phases:
- a first phase of selecting a particular revision mode from various revision modes offered by a main menu by moving said cursor to the corresponding function area and validating, this action clearing said main menu and replacing it with a secondary menu specific to the selected revision mode,
- a second phase of selecting the required way points on the navigation display screen to create a temporary flight plan, said second phase comprising (depending on the revision mode selected) the choice of a way point from which the revision is to be made and the choice of a way point at which the revision is to terminate, said choices being made by using said designator device to move said cursor to the sensitive area associated with the point in question and then validating, whereupon the system assigns the way point an identifying pattern, and
- a third phase for confirming or cancelling the revision by moving said cursor onto a confirm function area or a cancel function area and then operating said validator device, the system then displaying the new flight plan (confirm) or the old flight plan (cancel).

The method may advantageously comprise, during the above stages, the display on the ND screen of messages indicating what the operator should do.

Likewise, the designator and validator unit may be a touch-sensitive pad.

In this case, the advantages of the method previously described are clearly apparent:

- the pilot always works on the same medium, namely the ND screen, i.e. a graphic medium constituting the final display medium;
- as this medium is a head-up medium, head-down actions (or alternating head-up and head-down actions) are eliminated;
- the actions performed by the pilot on the pad are simple, quick and carried out in a sequence guided by means of messages.

In another aspect, the present invention consists in a device for implementing a method for revising the flight plan of an aircraft using a designator and validator device coupled to the flight management system of the aircraft so as to obtain on the navigation display screen of the flight management system, in addition to a geographical representation of the flight plan initially selected by the pilot:

a sensitive area associated with each point on the navigation display screen, dynamically assigned function areas used to construct menus, the function assigned to each area being variable from one menu to another and shown on the screen in corresponding relationship to that area, and a cursor moved on the navigation display screen by action of the pilot on the designator device whereby the cursor can be moved to a function area or a touch-sensitive area, the function represented by said function area being activated or a point of said touch-sensitive area being selected by action of the pilot on the validator unit, which method comprises the following phases:

a first phase of selecting a particular revision mode from various revision modes offered by a main menu by moving said cursor to the corresponding function area and validating, this action clearing said main menu and replacing it with a secondary menu specific to the selected revision mode, a second phase of selecting the required way point on the navigation display screen to create a temporary flight plan, said second phase comprising (depending on the revision mode selected) the choice of a way point from which the revision is to be made and the choice of a way point at which the revision is to terminate, said choices being made by using said designator device to move said cursor to the sensitive area associated with the point in question and then validating, whereupon the system assigns the way point an identifying pattern, and a third phase for confirming or cancelling the revision by moving said cursor onto a confirm function area or a cancel function area and then operating said validator device, the system then displaying the new flight plan (confirm) or the old flight plan (cancel), which device comprises a designator device provided with a validator device, said designator device being connected to the processor of the flight management system of the aircraft in order to obtain on the navigation display screen of said system, in addition to the geographical representation of the flight plan initially selected by the pilot:

a touch-sensitive area associated with each point of the navigation display screen, dynamically assigned function areas for constructing menus, the function assigned to each function area being variable from one menu to another and indicated on the screen in corresponding relationship to the function area, and a cursor moved on the navigation display screen by action of the pilot on the designator device so that the cursor can be moved to a function area or a touch-sensitive area, activating the function represented by the function area or selecting a point of said sensitive area being achieved by action of the pilot on the validator device.

One embodiment of this device is described hereinafter by way of non-limiting example with reference to the appended drawings.

DETAILED DESCRIPTION OF THE INVENTION

Figure 1:
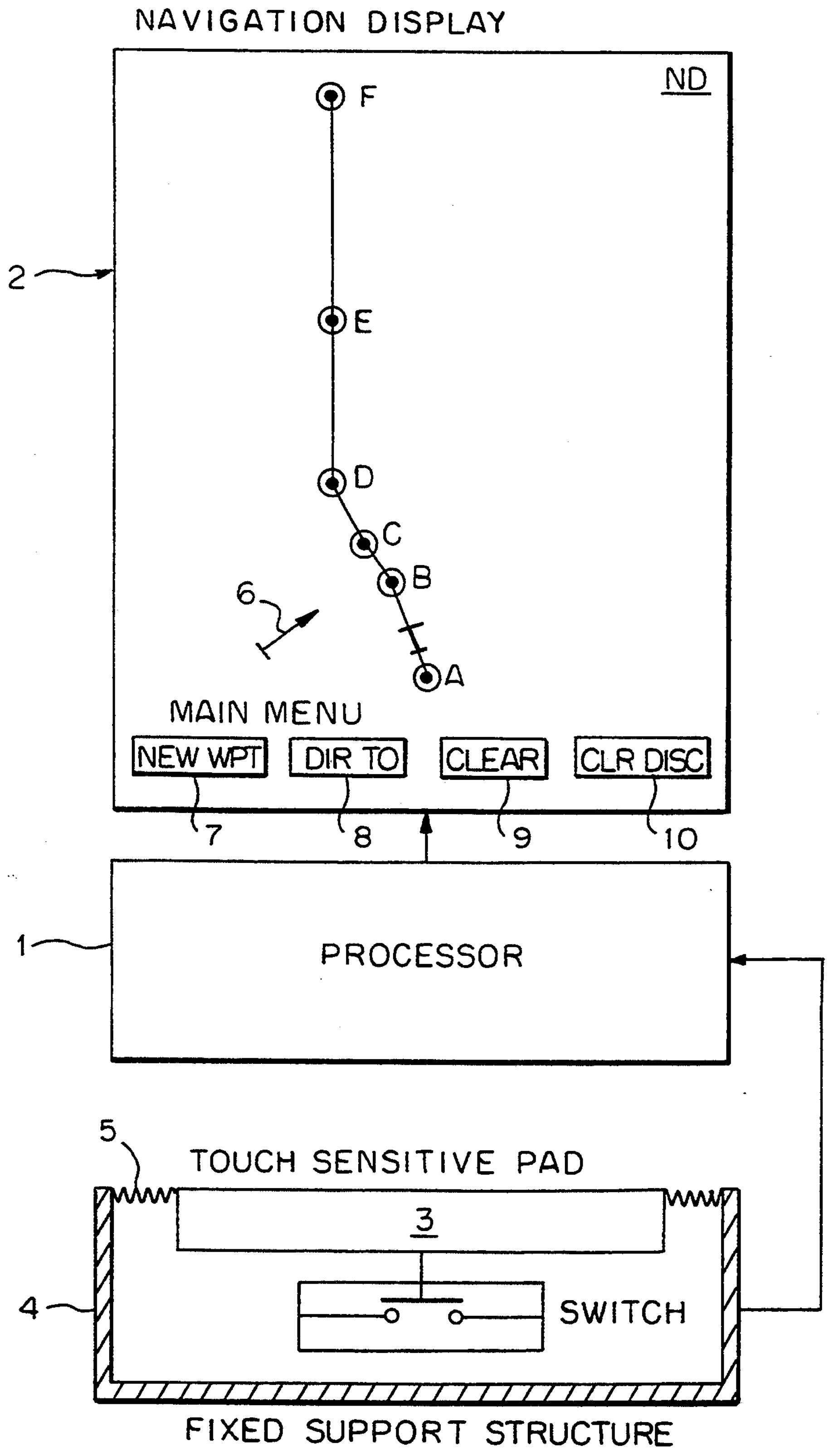
FIG. 1 is a diagrammatic representation of the hardware organization of the device in accordance with the invention.

Referring to FIG. 1, a device in accordance with the invention employs a processor 1, for example the on-board computer of an aircraft, which handles flight management and which computes data to be displayed on the navigation display (ND) screen, that is to say the route of the aircraft in the horizontal plane, on the basis of way points that the pilot selects when preparing the flight.

Dialogue between the pilot and the computer to revise the flight plan is conducted by means of a touch-sensitive pad comprising a touch-sensitive surface 3 mounted on a fixed support structure 4 through spring means 5.

The touch-sensitive pad 3 is of the kind described in U.S. Pat. No. 4,862,151 granted to the company SFENA (Société Francaise d'Equipements pour la Navigation Aérienne). On Aug. 29, 1989. It is designed to enable a cursor 6 to be moved across the ND screen 2 and an area of the screen indicated by the cursor 6 to be validated by exerting pressure on the pad 3 so as to depress it within the support structure 4. The depressed position of the pad 3 (validation position) can be sensed by a microswitch, for example, as diagrammatically shown in FIG. 1.

In this example the flight plan comprises a path through way points A through F each of which is at the center of a touch-sensitive area indicated by a small circle.

At the bottom of the screen are four rectangular function areas 7 through 10 for displaying the main menu and secondary menus.

Here the four function areas 7 through 10 indicate the four revision modes available on the main menu, namely:

"NEW WPT" to insert a new way point into the flight plan,

"DIR TO" to define a point to which the aircraft must fly from its current position, "CLEAR" to delete a way point, "CLR DISC" to eliminate a discontinuity.

The message "MAIN MENU" is additionally displayed above the area 7.

From the main menu shown in FIG. 1 and indicated by the reference number 11 in the flowcharts of FIGS. 9 through 12, a secondary menu is selected by the operator moving his finger over the touch-sensitive surface 3 to move the cursor 6 to the corresponding area and then pressing on the surface 3 to validate the selection.

Figure 2:
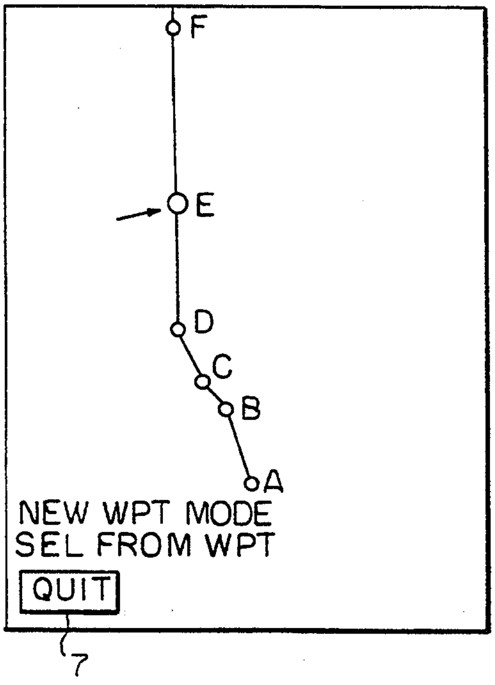
FIGS. 2 through 8 are diagrammatic views of a flight plan shown on the ND screen during the various stages of a revision which inserts a new way point followed by a "CLR DISC" type revision.

Selecting the "NEW WPT" function area (function area 7, FIG. 1 and block 12, FIG. 9) clears the four function areas 7 through 10 of the main menu and displays the function area 7 again marked "QUIT" (block 13) so that the pilot can return to the main menu (FIG. 2). The screen also displays a message "NEW WPT MODE" and an instruction to be followed by the operator, namely "SEL FROM WPT": select a start way point (block 14, FIG. 9).

Figure 3:
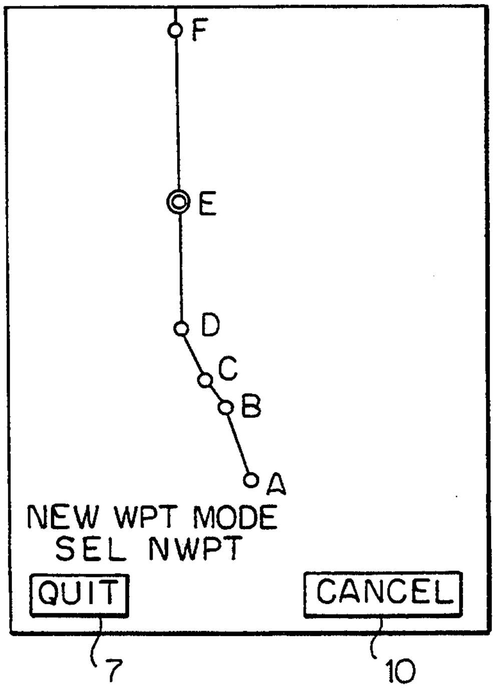

The operator then uses the pad 3 to move the cursor to a designated position and validates the chosen way point, in this example the point E which is then surrounded by a second identifying circle (FIG. 3).

Validating clears the secondary menu previously displayed (revision start way point selection mode) and substitutes a new menu for selecting the new way point to be added, the new menu comprising the following information that can be seen in FIG. 3:

"CANCEL" (area 10, block 15) to cancel the last selection made and return to the start way point selection menu, "QUIT" (area 7, block 16) to return to the main menu, and the "NEW WPT MODE" message and the instruction to be followed by the operator, namely "SEL NWPT" (block 17) which invites the operator to indicate using the cursor 6 the position of the new way point representing the end of the revision.

Figure 4:
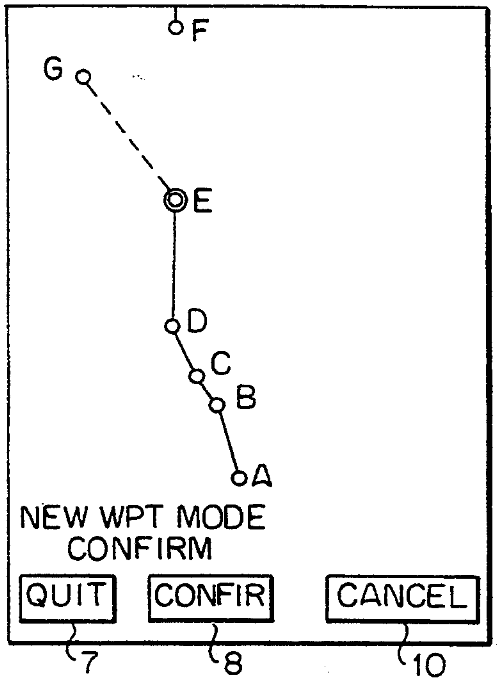

When the new way point G has been indicated and validated by pressing on the pad 3 the system enters confirmation mode, changing the menu again and indicating in dashed line the new path between the start way point E and the new way point G selected (FIG. 4). The new menu comprises the following function areas:

"QUIT" (area 7, block 18) to return to the main menu,

"CONFIRM" (area 8, block 19) to confirm the new flight plan, and

"CANCEL" (area 10, block 20) to eliminate the last way point selected and return to the mode for selecting a new way point.

The messages "NEW WPT MODE" and "CONFIRM" are displayed above area 7.

Figure 5:
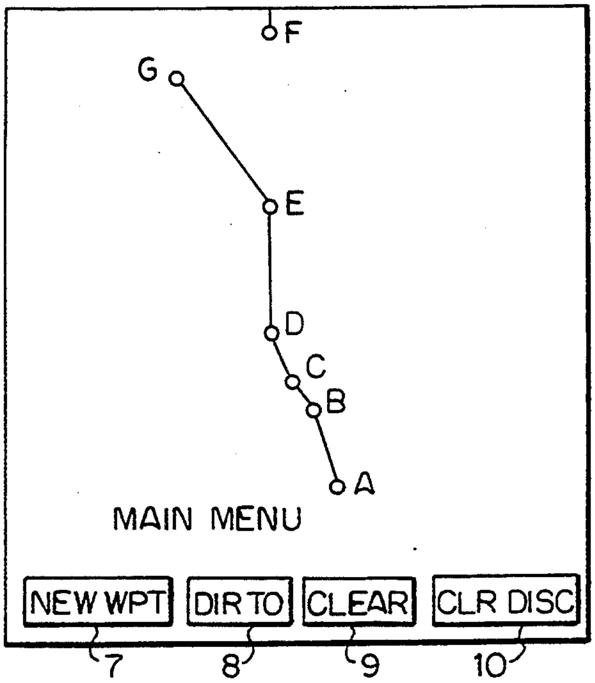

Confirming the new flight plan causes the system to adopt it, display it on the screen and return to the main menu (FIG. 5).

In this example the new way point G is not the end of the flight plan and consequently the new flight plan includes a discontinuity.

To show how the new way point is connected to the original flight plan the pilot must select the "CLR DISC" menu (block 21) to eliminate the discontinuity.

Figure 6:
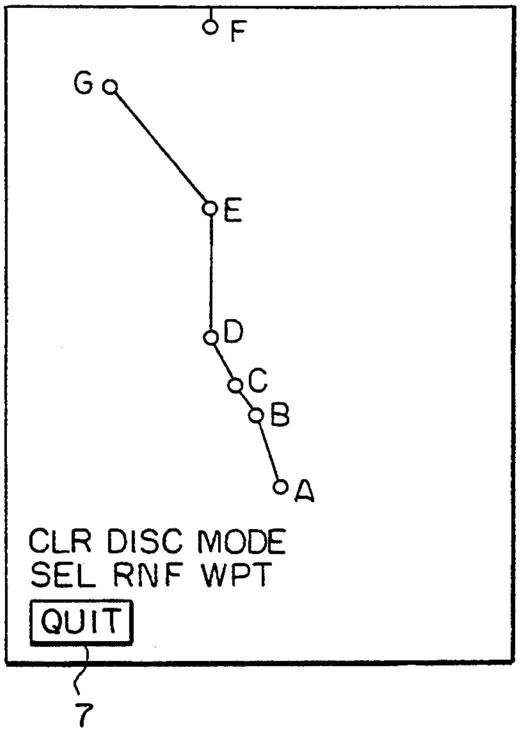

Validating this selection clears the main menu and replaces it with a new menu comprising the following information that can be seen in FIG. 6:

"QUIT" (area 7, block 22) to return to the main menu, and the messages "CLEAR DISC MODE" and the instruction to be followed by the operator, namely "SEL FROM WPT" (select an end of discontinuity way point—block 23—FIG. 10) inviting the operator to indicate the position of this new way point using the cursor.

Figure 7:
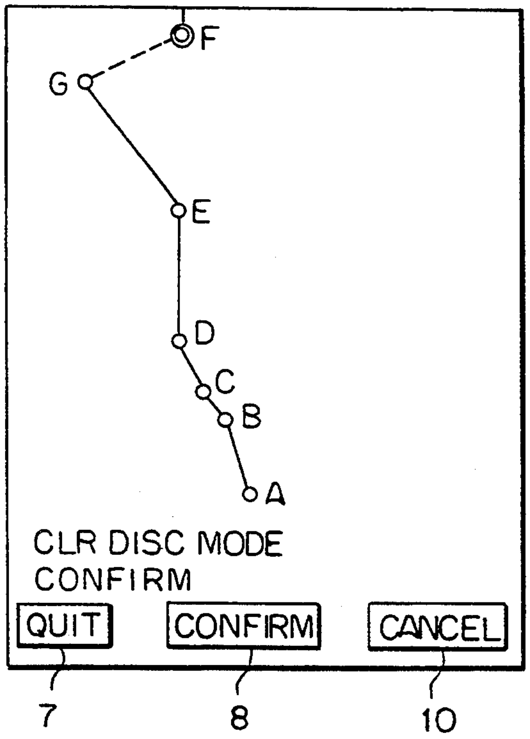

When the new way point (in this example point F) has been validated, the system enters confirmation mode, changing the menu again and showing in dashed line the new path between the new way point and the end of discontinuity way point (FIG. 7). The new menu comprises the following function areas:

"QUIT" (area 7, block 26) to return to the main menu,

"CONFIRM" (area 8, block 25) to confirm the new flight plan, and

"CANCEL" (area 10, block 24 ) to eliminate the last way point selected and return to the phase for selecting an end of discontinuity way point.

The messages "CLR DISC MODE" and "CONFIRM" are displayed above area 7.

Figure 8:
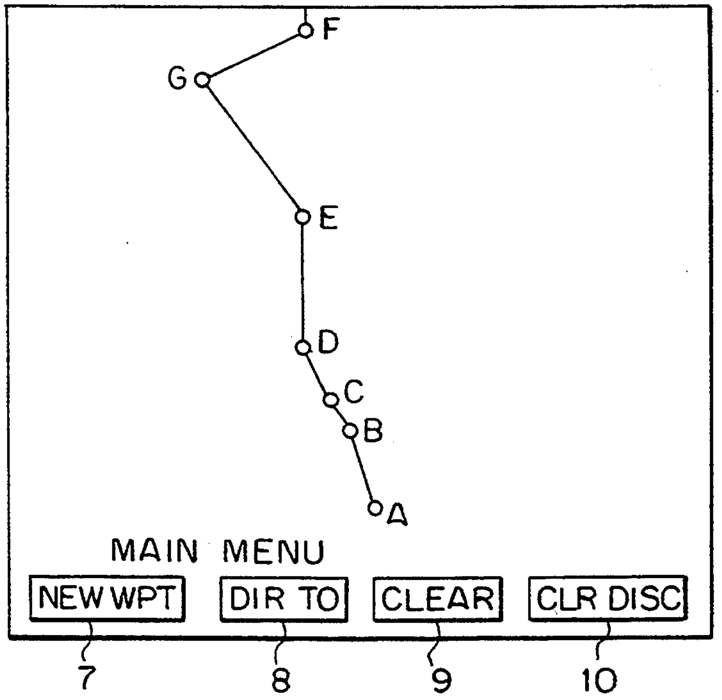
Figure 9:
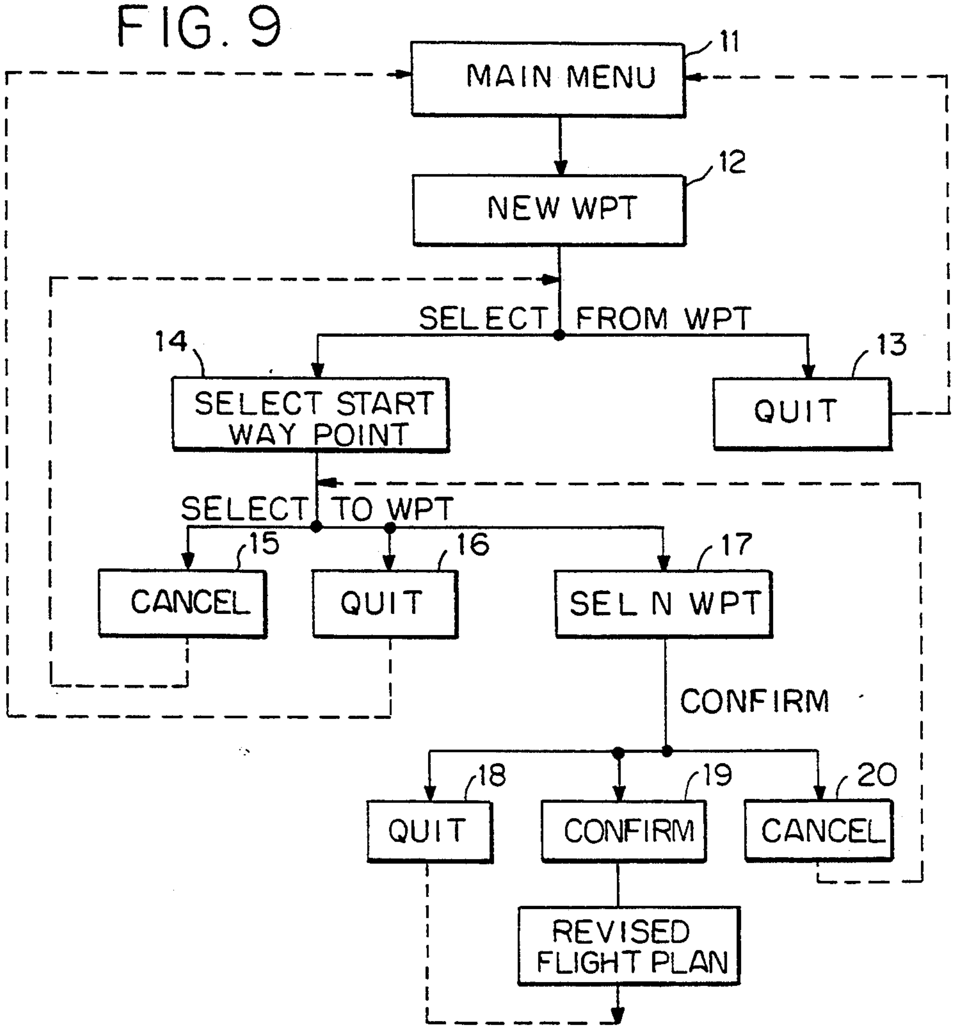
FIGS. 9 through 12 are flowcharts for the various types of revision listed in the main menu of the ND screen shown in FIG. 1.
Figure 10:
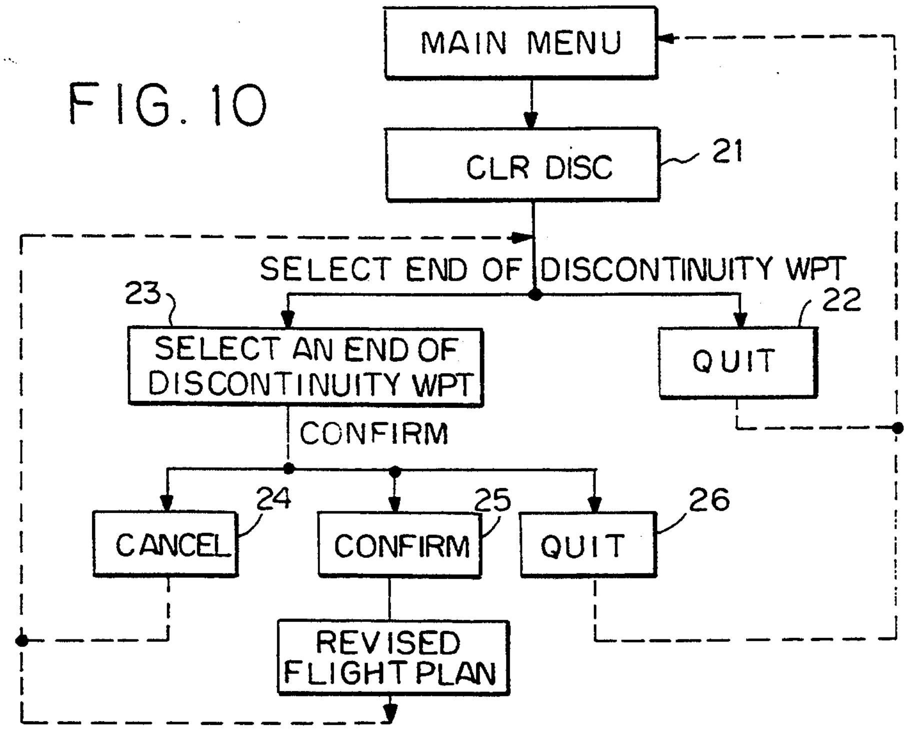
Figure 11:
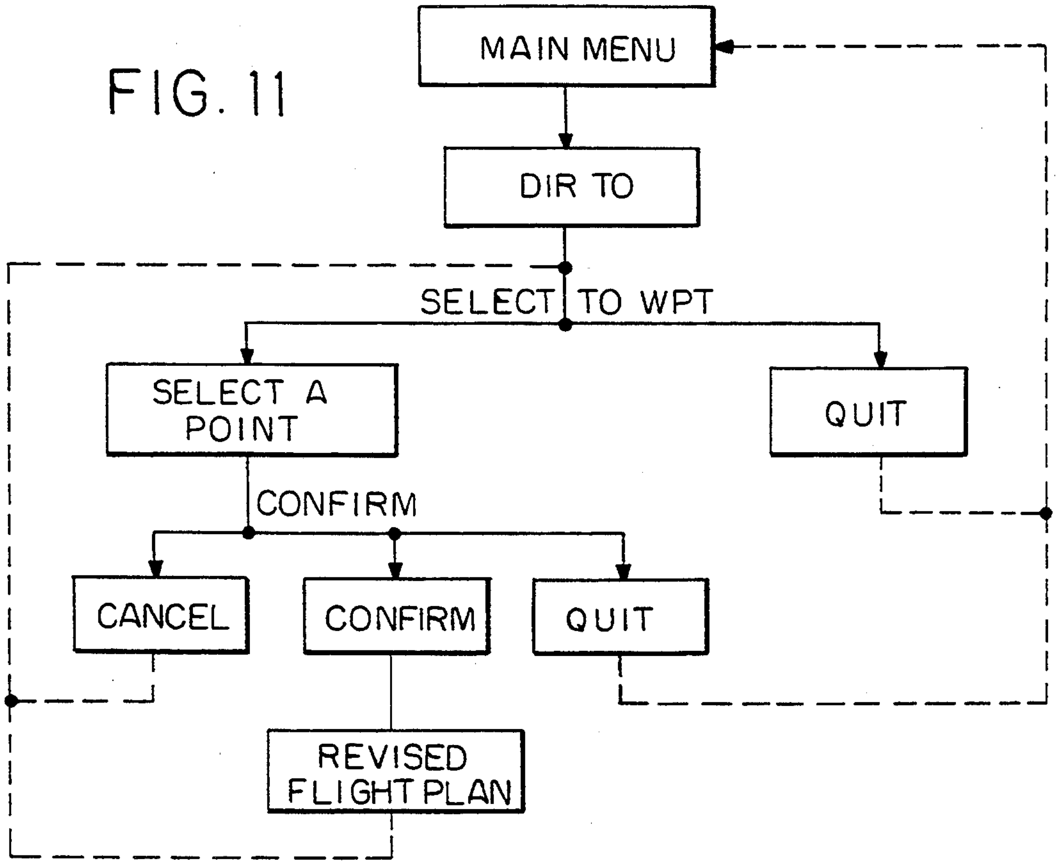
Figure 12:
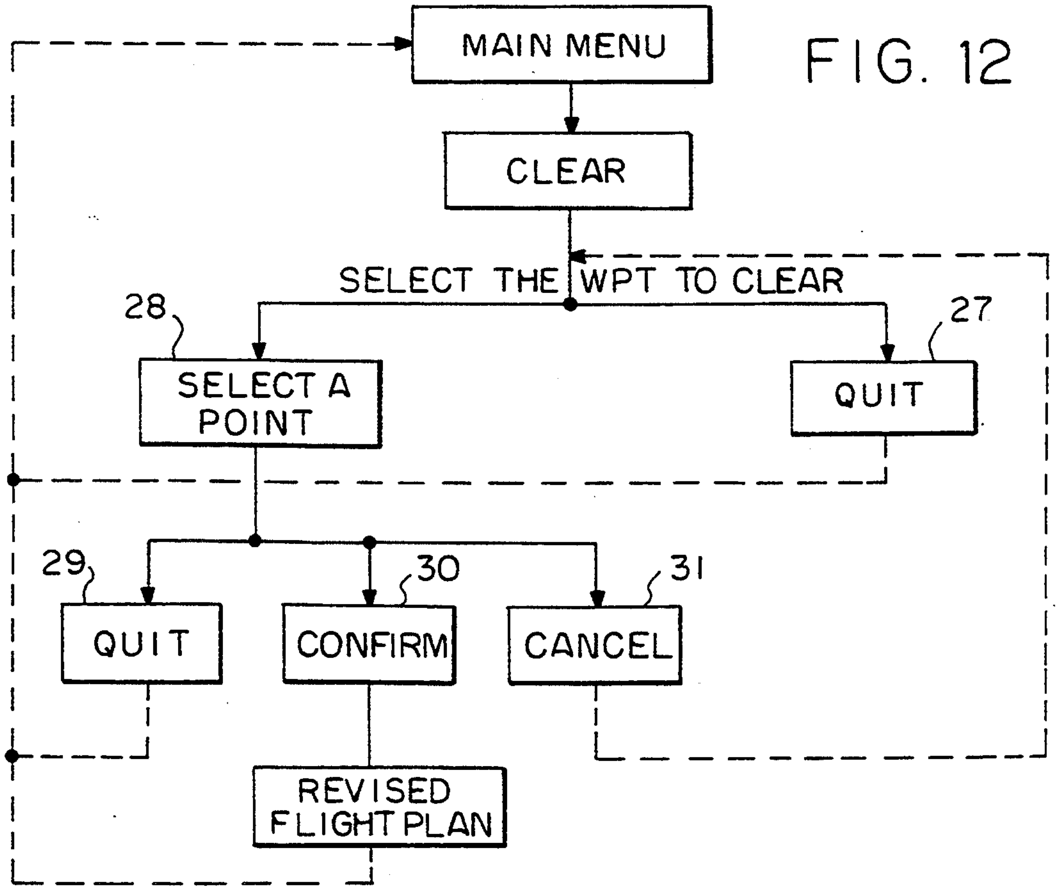

Confirming the new flight plan causes the system to adopt it, show it in full line and return to the main menu (FIG. 8).

The flowchart for the "DIR TO" function of the main menu (FIG. 11) is virtually identical to that of the "CLR DISC" function. The difference between the two flowcharts is that the way point which the pilot must determine is not a way point at the end of a discontinuity but a way point to which the aircraft must fly from its current position. Selecting the "DIR TO" revision mode clears the main menu which is replaced by a new menu comprising a "QUIT" function area to return to the main menu and a message inviting the operator to indicate with the cursor the new way point to which the aircraft is to fly, validating this point changing the menu and displaying a temporary flight plan of the new path to that way point, the new menu comprising a "QUIT" function area to return to the main menu, a "CONFIRM" function area to confirm the new flight plan and a "CANCEL" function area to eliminate the last way point selected and return to the mode for selecting a new way point. Confirming the new flight plan causes the system to adopt it, display and return to the main menu.

Of course, the "DIR TO" function may generate a discontinuity in which case the "CLR DISC" menu must also be executed.

The "CLEAR" function (clear a way point) (FIG. 12) includes a mode of selecting a flight plan way point with the function area 7 showing "QUIT" (block 27) to return to the main menu accompanied by the message "SELECT A WAY POINT" (block 28) inviting the pilot to indicate with the cursor the way point to be eliminated.

Validating this way point selects confirmation mode with function areas 7, 8 and 10 showing "QUIT", "CONFIRM", "CANCEL" (blocks 29, 30, 31). This confirmation mode is similar to those previously described.

There is claimed:

1. Method for revising an initial flight plan of an aircraft provided with a flight management system coupled to a navigation display screen having a plurality of points, each associated with a corresponding sensitive area, said method using a designator and validator device connected to the flight management system so as to generate on said navigation display screen, in addition to a geographical representation of the flight plan which comprises a plurality of way points:

function areas used to construct menus, each function area having a variable function which varies from one menu to another and which is shown on the screen in corresponding relationship to that function area, and a cursor moved on the navigation display screen by effecting a displacement of a finger on a sensitive surface of the designator and validator device so as to designate one of said function areas as well as one of said points, the function represented by the function area which is designated by the cursor as well as the coordinates of the point which is designated by the cursor being validated by exerting a pressure on said surface by means of said finger, which method comprises the following successive phases:

a first phase of selecting a particular revision mode from various revision modes offered by a main menu by moving said cursor to the corresponding function area and validating, this action clearing said main menu and replacing it with a secondary menu specific to the selected revision mode, a second phase of selecting required way points on the navigation display screen to create a temporary revised flight plan, said second phase comprising, depending on the revision mode selected, at least a step of designating by means of the designation device a first way point of the flight plan from which the revision is to be made and a second way point of the flight plan at which the revision is to terminate, a step of validating the said first and second way points and a step of assigning to the chosen way points once validated a temporary identifying pattern, and a third phase for confirming or cancelling the revision by moving said cursor onto a confirm function area or a cancel function area and then operating said validator device, the system then displaying the revised flight plan when the confirm function area is validated or the initial flight plan when the cancelled function is validated.

2. Method according to claim 1, wherein said designator and validator device comprises a touch-sensitive surface provided with validator means.

3. Method according to claim 1, comprising, during said phases, a display of messages on said navigation display screen indicating the revision mode selected and the action required of the operator.

4. Method according to claim 1 wherein the functions proposed by said main menu comprise the following revision modes:

"NEW WPT" to insert a new way point into the flight plan,

"DIR TO" to indicate a way point on the screen to which the aircraft must fly from its current position, "CLEAR" to delete a way point, "CLR DISC" to eliminate a discontinuity between two way points.

5. Device for revising an initial flight plan of an aircraft using a designator device provided with a validator unit and coupled to a flight management system of the aircraft so as to generate on a navigation display screen of the flight management system, in addition to a geographical representation of the flight plan comprising a plurality of way points:

a touch-sensitive area associated with each point on the navigation display screen, function areas used to construct menus, each function area having a variable function which varies from one menu to another and which is shown on the screen in corresponding relationship to that function area, and a cursor moved on the navigation display screen by effecting a displacement of a finger on a sensitive surface of the designator device so as to designate one of said function areas as well as one of said points, the function area being activated or a point of said touch-sensitive area being selected by action of the pilot on the validator unit, the validator unit comprising means for validating the function represented by the function area which is designated by the cursor as well as the coordinates of the point which is designated by the cursor, which method comprises the following phases:

a first phase of selecting a particular revision mode from various revision modes offered by a main menu by moving said cursor to the corresponding function area and validating, this selection clearing said main menu and replacing it with a secondary menu specific to the selected revision mode, a second phase of selecting a first way point from which the revision is to be made and the choice of a second way point at which the revision is to terminate, said choices being made by using said designator device to move said cursor to the sensitive areas associated with said first and second points and validating these points, whereupon the system assigns these way points identifying patterns, and a third phase for confirming or cancelling the revision by moving said cursor onto a confirm function area which, once validated, causes the revised flight plan to be displayed or by moving said cursor onto a cancel function area which, once validated, causes the initial flight plan to be displayed.

6. Method for revising an initial flight plan of an aircraft provided with a flight management system coupled to a navigation display screen having a plurality of points, each associated with a corresponding sensitive area, said method using a designator and validator device connected to the flight management system so as to generate on said navigation display screen, in addition to a geographical representation of the flight plan which comprises a plurality of way points:

function areas used to construct menus, each function area having a variable function which varies from one menu to another and which is shown on the screen in corresponding relationship to that function area, and a cursor moved on the navigation display screen by effecting a displacement of a finger on a sensitive surface of the designator and validator device so as to designate one of said function areas as well as one of said points, the function represented by the function area which is designated by the cursor as well as the coordinates of the point which is designated by the cursor being validated by exerting a pressure on said surface by means of said finger, which method comprises the following successive phases:

selecting from various revision modes offered by a main menu a revision mode "NEW WPT" to insert a new way point into the flight plan, a selection of this revision mode causing a clearance of said main menu, a redisplay of a second menu having a function "QUIT" whose activation causes a redisplay of the main menu and a display of a message indicating the current mode and inviting the operator to select a start way point representing the start of the revision, selecting the start way point, validating the selected start way point, this validation clearing the second menu and replacing it with a third menu for selecting a new way point to be added, said third menu comprising a function "CANCEL" whose activation causes canceling of the newly added way point and returning to the second menu and a function "QUIT" whose activation causes a return to the main menu, and a message inviting the operator to use the cursor to indicate a new way point, validating the newly added way point, this validation replacing the second menu by a third menu and temporarily indicating a new path between the start way point and the new way point provided with a temporary identifying pattern, the third menu comprising a function area marked "QUIT" to return to the main menu, a function area marked "CONFIRM" to confirm the new flight plan so as to cause the system to adopt it, display it without any temporarily identifying pattern and return to the main menu, and a function marked "CANCEL" to eliminate the new way point and to return to the second menu.

7. Method for revising an initial flight plan of an aircraft provided with a flight management system coupled to a navigation display screen having a plurality of points, each associated with a corresponding sensitive area, said method using a designator and validator device connected to the flight management systems so as to generate on said navigation display screen, in addition to a geographical representation of the flight plan which comprises a plurality of way points:

function areas used to construct menus, each function area having a variable function which varies from one menu to another and which is shown on the screen in corresponding relationship to that function area, and a cursor moved on the navigation display screen by effecting a displacement of a finger on a sensitive surface of the designator and validator device so as to designate one of said function areas as well as one of said points, the function of the function area which is designated by the cursor as well as the coordinates of the point which is designated by the cursor being validated by exerting a pressure on said surface by means of said finger, which method comprises the following successive phases:

selecting from various revision modes offered by a main menu a revision mode "CLR DISC" to eliminate a discontinuity between two way points, the selection of this revision mode clearing the main menu and replacing it with a second menu comprising a function area marked "QUIT" to return to the main menu and a message inviting the operator to use the cursor to indicate an end of the discontinuity way point, validating this way point, this validation changing the second menu by a third menu and temporarily indicating a path eliminating the discontinuity, the third menu comprising a function area marked "QUIT" to return to the main menu, a function area marked "CONFIRM" to confirm the new flight plan and a function area marked "CANCEL" to eliminate the previously indicated way point and return to the second menu, confirming the new flight plan by selecting the function area marked "CONFIRM", this confirmation causing the system to adopt it, display it and return to the main menu.

8. Method for revising an initial flight plan of an aircraft provided with a flight management system coupled to a navigation display screen having a plurality of points, each associated with a corresponding sensitive area, said method using a designator and validator device connected to the flight management system so as to generate on said navigation display screen, in addition to a geographical representation of the flight plan which comprises a plurality of way points:

function areas used to construct menus, each function area having a variable function which varies from one menu to another and which is shown on the screen in corresponding relationship to that function area, and a cursor moved on the navigation display screen by effecting a displacement of a finger on a sensitive surface of the designator and validator device so as to designate one of said function areas as well as one of said points, the function of the function area which is designated by the cursor as well as the coordinates of the point which is designated by the cursor being validated by exerting a pressure on said surface by means of said finger, which method comprises the following successive phases:

selecting from various revision modes offered by a main menu a revision mode "DIRTO" to indicate a way point on the screen to which the aircraft must fly from its current position, the selection of this revision mode clearing the main menu and replacing it with a second menu comprising a function area marked "QUIT" to return to the main menu and a message inviting an operator to use the cursor to select a new way point to which the aircraft must fly, validating this new way point, this validation changing the second menu by a third menu and temporarily indicating the new path to this new way point, the third menu comprising a function area marked "QUIT" to return to the main menu, a function area marked "CONFIRM" to confirm a new flight plan including said new path and a function area marked "CANCEL" to eliminate the new way point and return to the second menu, and confirming the new flight plan, this confirmation causing the system to adopt it, display it and return to the main menu.

9. Method for revising an initial flight plan of an aircraft provided with a flight management system coupled to a navigation display screen having a plurality of points, each associated with a corresponding sensitive area, said method using a designator and validator device connected to the flight management system so as to generate on said navigation display screen, in addition to a geographical representation of the flight plan which comprises a plurality of way points:

function areas used to construct menus, each function area having a variable function which varies from one menu to another and which is shown on the screen in corresponding relationship to that function area, and a cursor moved on the navigation display screen by effecting a displacement of a finger on a sensitive surface of the designator and validator device so as to designate one of said function areas as well as one of said points, the function of the function area which is designated by the cursor as well as the coordinates of the point which is designated by the cursor being validated by exerting a pressure on said surface by means of said finger, which method comprises the following successive phases:

selecting from various revision modes offered by a main menu a revision mode "CLEAR" to delete a way point, the selection of this revision mode clearing the main menu and replacing it with a second menu comprising a function area marked "QUIT" to return to the main menu and a message inviting an operator to move the cursor to select a wrong way point to be eliminated, validating this wrong way point, selecting the mode for confirming the new flight plan, this confirmation causing the system to adopt it, to display it and to return to the main menu.

* * * * *